Dec. 4, 1923.

H. H. CLARK

HOLDER FOR DISK SHAPED OBJECTS

Filed March 21, 1923

1,476,285

Horace H. Clark Inventor

By his Attorney

Patented Dec. 4, 1923.

1,476,285

UNITED STATES PATENT OFFICE.

HORACE H. CLARK, OF HARTSDALE, NEW YORK, ASSIGNOR TO CLARK FIBRE PRODUCTS CORPORATION, A CORPORATION OF DELAWARE.

HOLDER FOR DISK-SHAPED OBJECTS.

Application filed March 21, 1923. Serial No. 626,719.

*To all whom it may concern:*

Be it known that I, HORACE H. CLARK, a citizen of the United States of America, residing at Hartsdale, Westchester County, State of New York, have invented certain new and useful Improvements in Holders for Disk-Shaped Objects, of which the following is a specification.

My invention is particularly designed for holding lenses in goggles used by workers whose eyes are to be protected thereby from sparks and flying particles, but it is equally useful for holding other disk-shaped objects.

In goggles of the class referred to the lenses are usually made of a tough glass which cannot be easily fractured, but such lenses are liable to be scratched or cut or cracked by flying particles, and so often need renewal.

My invention provides a simple and cheaply constructed holder for such lenses which exerts a firm grip on them when in locked position, but also permits a lens to be easily removed and replaced with a new one when the parts are placed in unlocked position. The best form of apparatus embodying my invention at present known to me is illustrated in the accompanying sheet of drawings in which—

Figure 1:
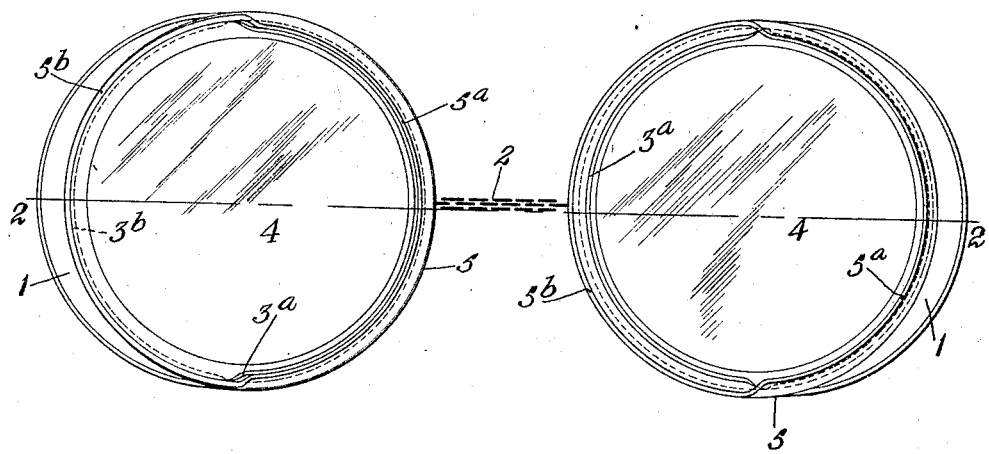
Fig. 1 is a front view of a pair of goggles equipped with my invention, the right lens holder being in locked position and the left one in unlocked position.
Figure 2:
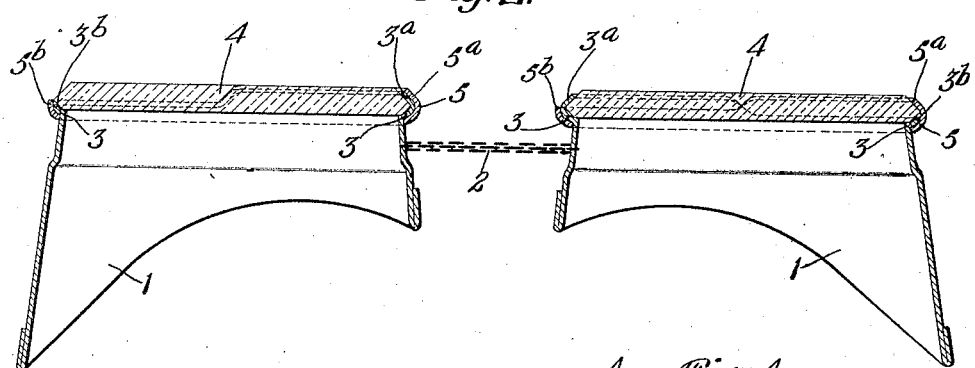
Fig. 2 is a section on line 2—2 of Fig. 1.

Throughout the drawings like reference characters indicate like parts. 1—1 are tubular members shaped to fit around the eyes of the wearer in the usual manner, held together by a chain 2, and provided with flanges 3—3 at their outer ends for receiving the lenses 4—4.

Each flange 3 of the rigid member 1, has a semi-circumferential portion $3^a$, which both supports and overhangs the periphery of the lens seated or supported in it, and a complementary, partly cut away, semi-circumferential portion $3^b$, which only supports the periphery of the lens but does not overhang it. Consequently the lens can be easily slipped into or out of the holder or pocket so formed in the rigid member 1. On each such rigid flanged portion is mounted a ring-shaped member 5, rotatable thereon, one-half or semi-circle $5^a$ of which corresponds in shape and outline to the fully flanged portion $3^a$ of the rigid member, while the half or semi-circle $5^b$ is cut away correspondingly to the portion $3^b$ of the rigid member.

When these parts are in the position shown at the left hand side of the drawing, with the cut-away portion $5^b$ and $3^b$ registering, the lens can be as easily slipped into or out of position in the holder as though the ring-shaped member were not present, but if after the lens is so placed the ring-shaped member 5 is rotated so that its overhanging portion $5^a$ no longer registers with that of $3^a$ of the rigid member, the lens is then firmly held in position by the combined action of the two overhanging flanges $3^a$ and $5^a$ which then jointly extend around more than 180° of the periphery of the lens. When the ring 5 is rotated so that its overhanging flange portion $5^a$ is diametrically opposite that of $3^a$ of the rigid member, as shown in the right-hand portion of the drawing, the lens is then entirely surrounded by the overhanging flanges and the utmost security of lens fastening results. In operating my invention, therefore, the ring-shaped member is placed in the position shown in the left-hand side of the drawing, the lens inserted and the ring then turned to the position shown in the right-hand side of the drawings.

Figures 3, 4:
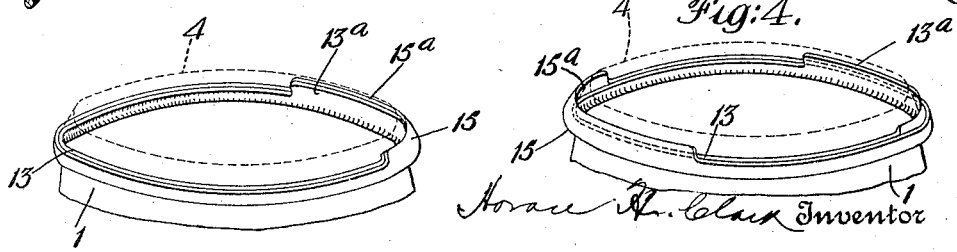
Figs. 3 and 4 are perspective views of a modification.

While the flange portions $3^a$ and $5^a$ are each shown as continuous through 180° in the drawings, this is not absolutely necessary so long as they are so formed that when the ring-shaped member 5 is turned in a locking or holding position there will be overhanging flange portions $3^a$ and $5^a$ engaging more than 180° of the periphery of the lens. Thus, as shown in Figs. 3 and 4, the flange 13 on the tubular member 1 may have only a short overhanging portion $13^a$, and the ring-shaped member 15 may have only a correspondingly short overhanging portion $15^a$. With this modified construction the lens will still be firmly held if the ring 15 is turned so that flange $15^a$ is separated approximately 180 degrees from flange $13^a$ as shown in Fig. 4, while said lens may easily be removed if the ring 15 is turned so that these two flanges coincide, as shown in Fig. 4. If the ring is turned so that the overhanging flanges $13^a$ and $15^a$ are only about 90 degrees apart, the lens can usually be inserted or removed but if the angle is much more than 90 degrees the lens is held quite securely. My invention, therefore, is not to be limited to the exact forms of flanges shown.

Preferably, the members 1 and 5 are formed of some material originally plastic so that they can be molded into shape, ring-shaped member 3 being molded *in situ*, although the ring-shaped member may be made first and the flanged end 3 of the member 1 spun into the ring while said flanged end is still plastic.

Having described my invention, I claim:

1. The combination with a disk-shaped member, of a holder therefor, comprising a rigid circular flange adapted to surround and support said disk-shaped member, said flange having a projection overhanging the periphery of said member throughout an angle of not more than 180° thereof, and a ring-shaped member mounted and rotatable on said flange having an overhanging portion extending throughout an angle of not more than about 180° of its circumference.

2. A detachable lens holder comprising in combination a member of tubular shape having at one end a circular flange adapted to receive and support said lens, a short portion of the circumference of which flange overhangs the periphery of the lens when the latter is in position, while the remainder of said flange is cut away sufficiently to remove all such overhanging portion, and a ring-shaped member rotatable on the exterior of said flange, said ring-shaped member having a short portion only of its circumference overhanging the periphery of such lens, whereby, when the middle of the overhanging portions of ring and flange are separated by an angle of approximately 180 degrees, the lens is firmly held by them, but when they are separated by an angle of less than 90 degree the lens may be lifted out.

HORACE H. CLARK.